(12) United States Patent
Aratani et al.

(10) Patent No.: US 7,586,491 B2
(45) Date of Patent: Sep. 8, 2009

(54) IMAGE DISPLAY METHOD AND IMAGE DISPLAY APPARATUS

(75) Inventors: Shuntaro Aratani, Machida (JP); Tomoyuki Ohno, Zama (JP); Katsuhiro Miyamoto, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

(21) Appl. No.: 11/423,552

(22) Filed: Jun. 12, 2006

(65) Prior Publication Data

US 2006/0284810 A1 Dec. 21, 2006

(30) Foreign Application Priority Data

Jun. 15, 2005 (JP) .............. 2005-175379

(51) Int. Cl.
*G06T 15/70* (2006.01)
(52) U.S. Cl. ............... 345/473; 345/90; 345/474; 345/475; 345/581; 345/589; 345/600; 345/603; 349/90
(58) Field of Classification Search ........... 345/90, 345/473, 474, 475, 581, 589, 600, 603; 348/239, 348/578, 333.12
See application file for complete search history.

(56) References Cited

U.S. PATENT DOCUMENTS

| 6,297,846 | B1 | 10/2001 | Edanami | 348/239 |
| 7,196,733 | B2 | 3/2007 | Aratani et al. | 348/581 |
| 2004/0027369 | A1* | 2/2004 | Kellock et al. | 345/716 |
| 2004/0117830 | A1 | 6/2004 | Ohno et al. | 725/51 |
| 2004/0261103 | A1 | 12/2004 | Ohno et al. | 725/38 |
| 2004/0263664 | A1 | 12/2004 | Aratani et al. | 348/333.12 |
| 2005/0044112 | A1 | 2/2005 | Yamamoto et al. | 707/104.1 |
| 2006/0285034 | A1 | 12/2006 | Aratani et al. | 349/90 |

FOREIGN PATENT DOCUMENTS

| JP | 10-51755 | 2/1998 |
| JP | 2002-281450 | 9/2002 |
| JP | 2004-343472 | 12/2004 |
| JP | 2005-33276 | 2/2005 |
| JP | 2005-056387 | 3/2005 |

* cited by examiner

*Primary Examiner*—Kimbinh T Nguyen
(74) *Attorney, Agent, or Firm*—Fitzpatrick, Cella, Harper & Scinto

(57) ABSTRACT

This invention implements an image display technique capable of setting a display effect and providing a more effective display which reflects a feature in an image without performing any cumbersome operation by a viewing user in a slide show of sequentially displaying digital images. An image display method of adding a special effect to a plurality of images, changing the plurality of images in time series, and sequentially displaying the plurality of images includes an input step of inputting an image, an area detection step of detecting a plurality of feature areas from the input image, a determination step of determining the content of the special effect on the basis of the detection results of the plurality of detected feature areas, and a display control step of displaying the image with the determined special effect.

14 Claims, 17 Drawing Sheets

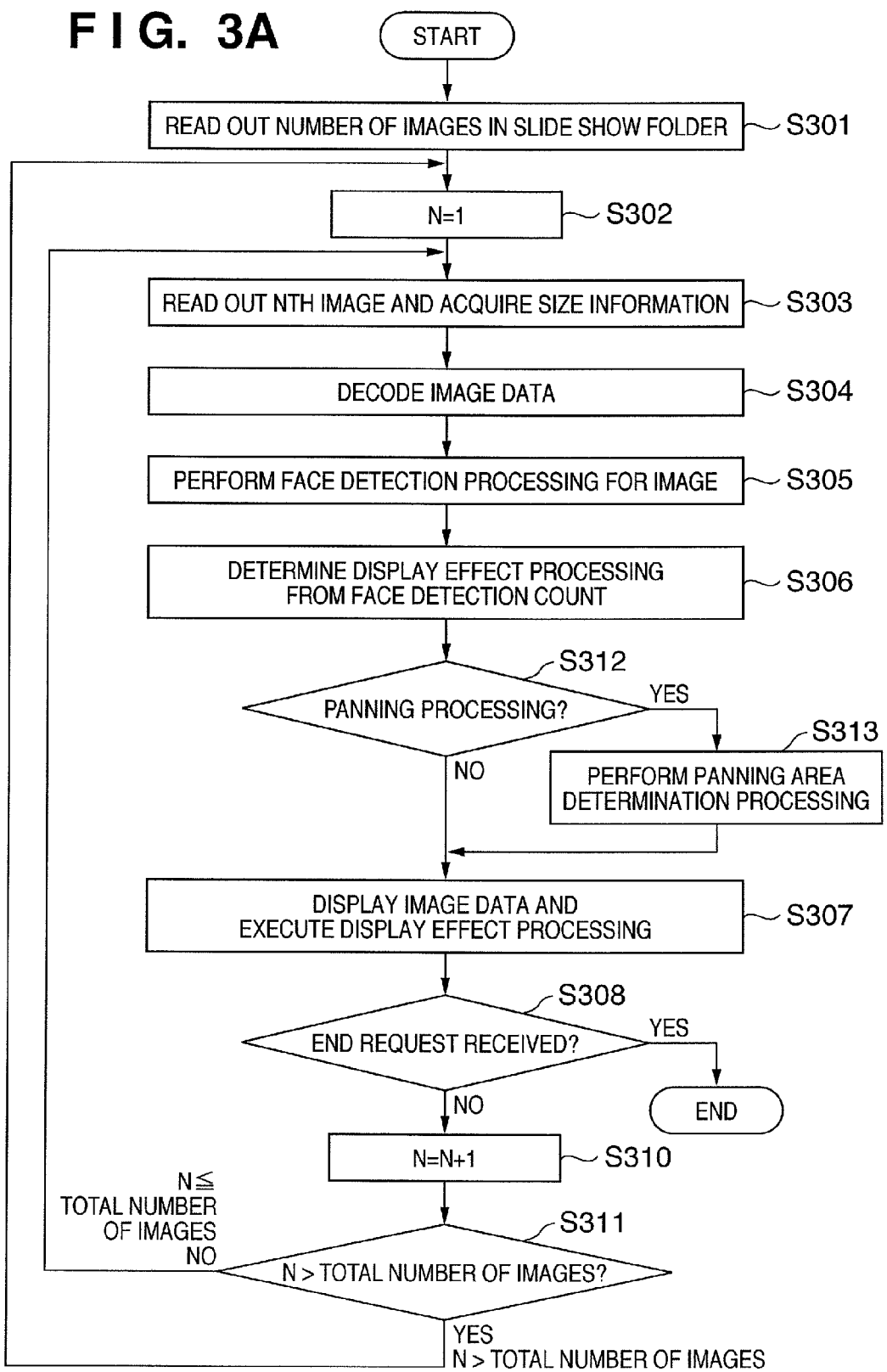

FIG. 4

| FACE DETECTION COUNT | DISPLAY EFFECT |
|---|---|
| 1 | FULL VIEW → ZOOMING TO FACE POSITION |
| 2~3 | PANNING ON LINE PASSING THROUGH ALL FACES UPON ZOOMING |
| 4≦OR 0 | FULL VIEW OF IMAGE → ZOOM OUT |

FIG. 6

| DISTANCE BETWEEN FACE AREAS | SIZE OF EXTRACTED RECTANGLE |
|---|---|
| d < 500 | 600 × 450 |
| 500 ≦ d | 800 × 600 |

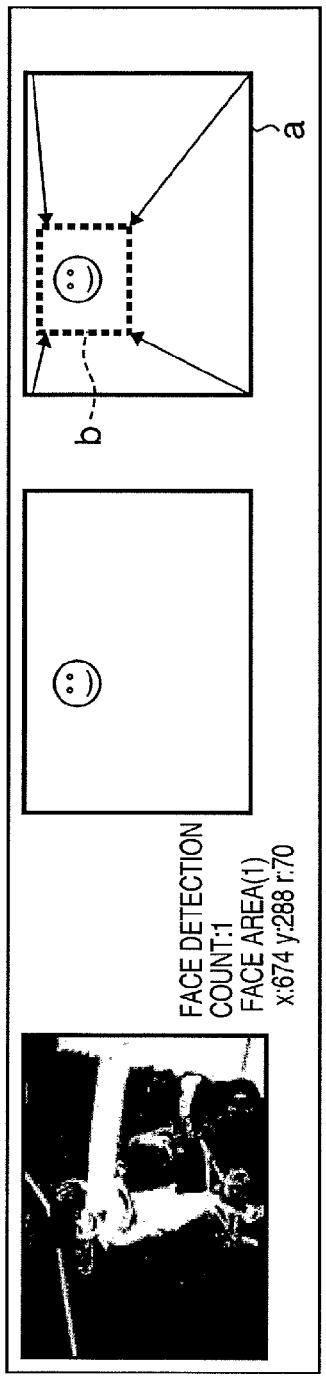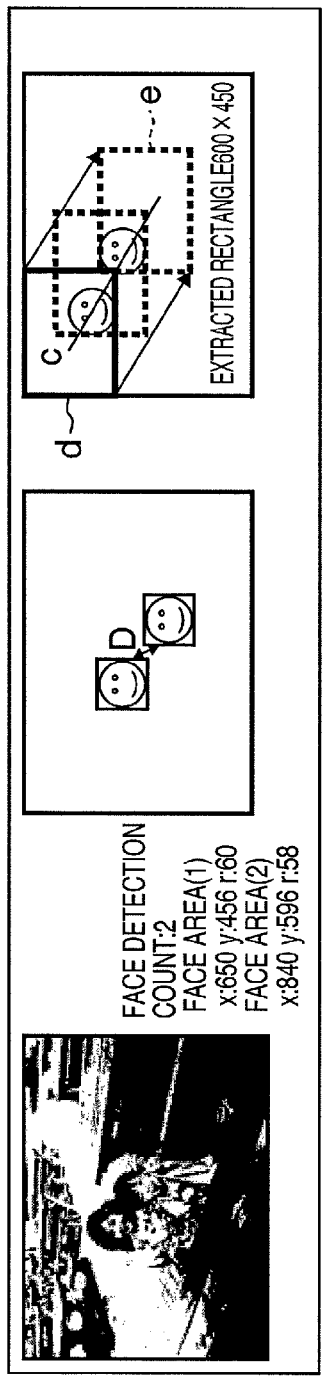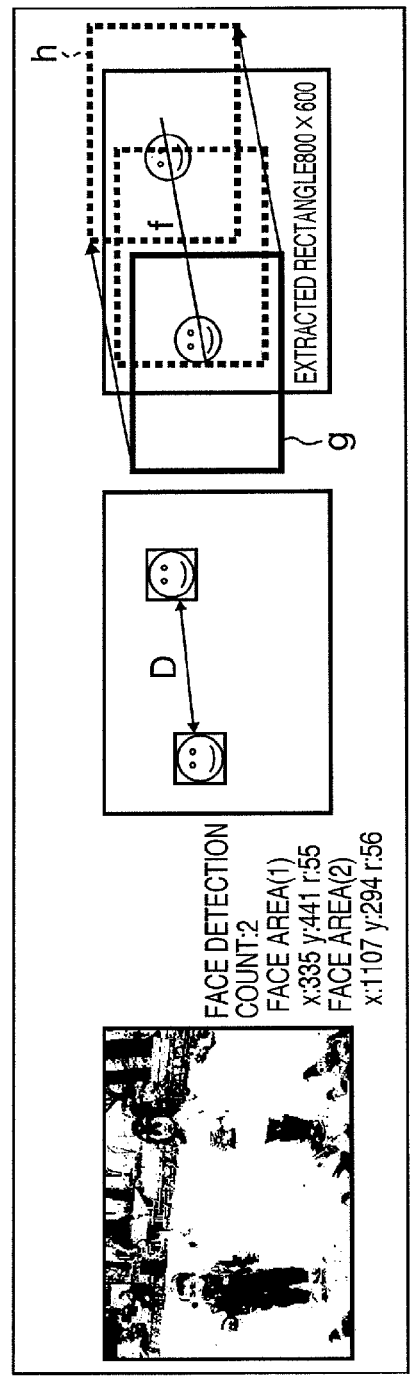

2-SHOT MODE

IMAGE DISPLAY METHOD AND IMAGE DISPLAY APPARATUS

FIELD OF THE INVENTION

The present invention relates to an image display technique of displaying image data on a screen.

BACKGROUND OF THE INVENTION

Digital high-definition broadcasting is starting, and it becomes possible to enjoy more impressive images of higher qualities than conventional ones at home along with the prevalence of high-definition television receivers (to be also simply referred to as television sets hereinafter). As electronic still cameras become popular, many users display electronic still and moving images on the monitors of personal computers and television sets and enjoy the displayed images.

In this situation, there are increasing user demands to not only display photographed still and moving images on television sets, but also "passively" view such images like television programs or enjoy them with presentations and audio/video effects like television programs and movies.

A slide show display is a method of sequentially displaying digital image data without any user operation. As a method of adding an effect to a slide show display, there are proposed a method of controlling a display switching effect in accordance with the settings of the display switching effect added in advance to distributed still images, as disclosed in Japanese Patent Laid-Open No. 2002-281450, and a method of allowing the user to freely change the display switching effect to another one.

However, the technique proposed in Japanese Patent Laid-Open No. 2002-281450 requires work by the contents creator to add a display effect in order to add a high display effect to a slide show. In addition, the user can only exchange a still image switching effect control instruction with another switching effect control instruction. That is, according to the conventional technique, it is difficult to automatically or easily add a display effect appropriate for the contents of each photograph.

SUMMARY OF THE INVENTION

The present invention has been made to overcome the conventional drawbacks, and has as its object to implement an image display technique capable of setting a display effect and providing a more effective display which reflects a feature in an image without performing any cumbersome operation by a viewing user in a slide show of sequentially displaying digital images.

Japanese Patent Laid-Open No. 10-051755 proposes a technique of determining and extracting an image range to be displayed, and adjusting the image range to the size of the display screen in accordance with the degree of movement of the position of a person in a video conference terminal.

However, according to the technique disclosed in Japanese Patent Laid-Open No. 10-051755, an image which shows a plurality of persons cannot be more effectively displayed in a slide show.

It is, therefore, another object of the present invention to implement an image display technique capable of effectively emphasizing and displaying a plurality of objects when one image contains a plurality of objects.

In order to achieve the above objects according to the present invention, there is provided an image display method of adding a special effect to a plurality of images, changing the plurality of images in time series, and sequentially displaying the plurality of images, comprising:

an input step of inputting an image;

an area detection step of detecting a plurality of feature areas from the input image;

a determination step of determining a content of the special effect on the basis of detection results of the plurality of detected feature areas; and a display control step of displaying the image with the determined special effect.

The present invention includes a program for causing a computer to execute the image display method, and a computer-readable recording medium which stores the program.

According to the present invention, there is provided an image display apparatus which adds a special effect to a plurality of images, changes the plurality of images in time series, and sequentially displays the plurality of images, comprising:

an input unit adapted to input an image;

an area detection unit adapted to detect a plurality of feature areas from the input image;

a determination unit adapted to determine a content of the special effect on the basis of detection results of the plurality of detected feature areas; and a display controller adapted to display the image with the determined special effect.

According to the present invention, for example, the contents of a special effect to an image containing a plurality of feature areas are optimized in performing slide show display of adding a special effect to a plurality of images, changing the images in time series, and sequentially displaying the images. A more effective display which reflects a feature in an image can be obtained without performing any cumbersome operation by the user.

When part of an image containing a plurality of feature areas is panned and displayed in time series, the ratio of the display time of a specific feature area can always be kept high to implement a more effective presentation.

Other objects and advantages besides those discussed above shall be apparent to those skilled in the art from the description of a preferred embodiment of the invention as follows. In the description, reference is made to the accompanying drawings, which form a part thereof, and which illustrate an example of the invention. Such an example, however, is not exhaustive of the various embodiments of the invention, and therefore reference is made to the claims which follow the description for determining the scope of the invention.

BRIEF DESCRIPTION OF THE DRAWINGS

FIGS. 3A and 3B are flowcharts showing display control processing in the first embodiment;

FIG. 4 is a table illustrating an information table used to determine the parameter of a display effect in the first embodiment;

FIG. 6 is a table showing an example of an information table used to determine the size of an extracted rectangle in the first embodiment;

FIGS. 7A to 7C are views showing the operation of display control processing in the first embodiment;

DETAILED DESCRIPTION OF THE PREFERRED EMBODIMENTS

Preferred embodiments of the present invention will be described in detail below with reference to the accompanying drawings.

Note that embodiments to be described below are merely an example of an implementation means of the present invention, and should be properly modified or changed in accordance with the configuration of an apparatus and various conditions to which the present invention is applied. The present invention is not limited to the following embodiments.

First Embodiment

The first embodiment according to the present invention will be described below.

Figure 1:
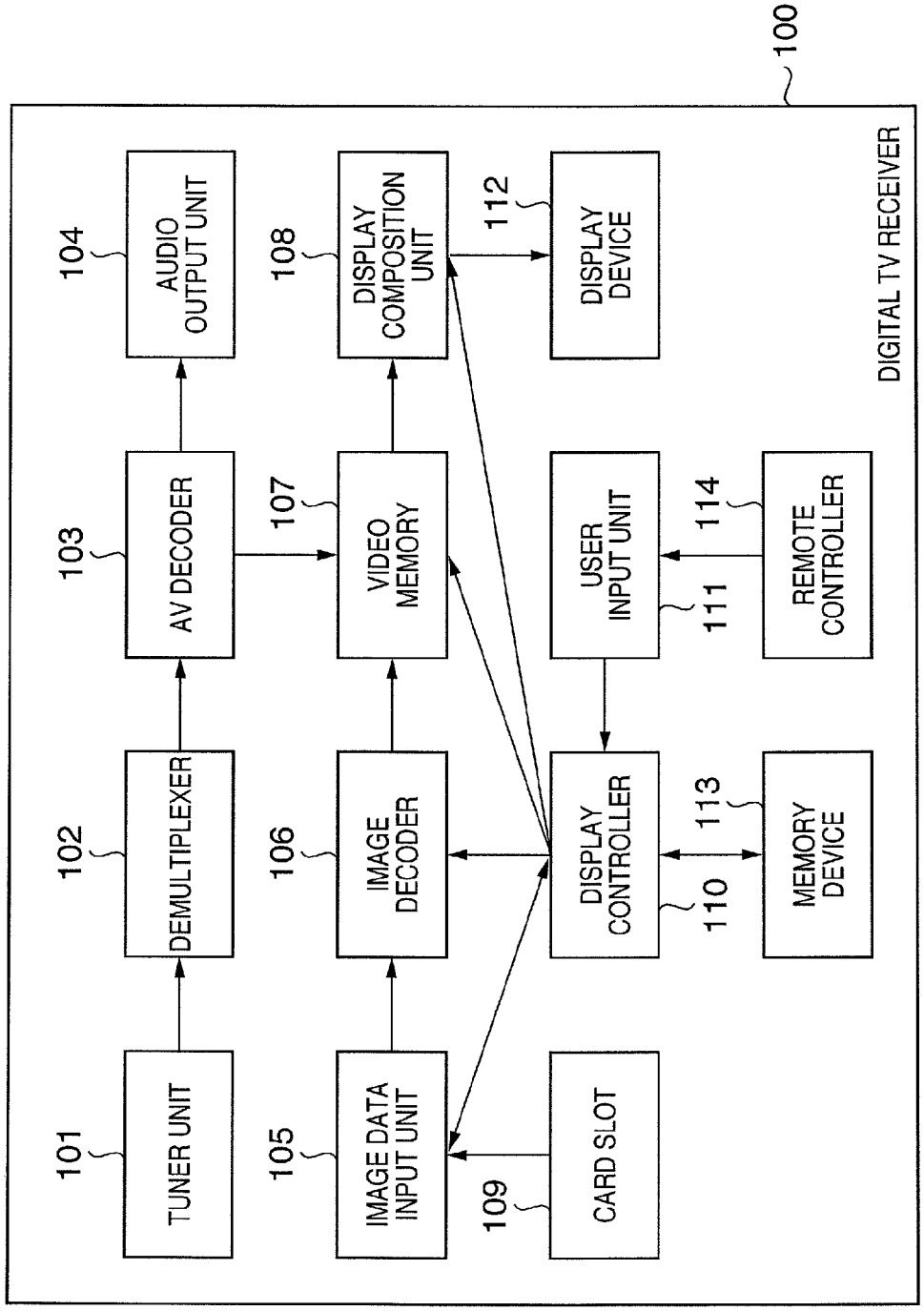
FIG. 1 is a block diagram showing the configuration of a digital TV receiver according to the first embodiment of the present invention.

FIG. 1 is a block diagram showing the configuration of a digital TV (television) receiver 100 to which the present invention is applied.

(Description of Units of Receiver)

In FIG. 1, a signal received by an antenna (not shown) is input to a tuner unit 101. The tuner unit 101 performs processes such as demodulation and error correction for the input signal to generate digital data of a so-called transport stream format. The tuner unit further descrambles the generated transport stream (TS) data, and outputs the descrambled data to a demultiplexer 102.

The demultiplexer 102 extracts video data and audio data from TS data which is input from the tuner unit 101 and contains video and audio data of a plurality of channels, electronic program guide (EPG) data, data broadcasting data, and the like that are multiplexed by time division. The demultiplexer 102 outputs the video data and audio data to an audio video (AV) decoder 103. The video data processed by the AV decoder 103 is written in a video memory 107, and output to a display device 112 via a display composition unit 108. The audio data is output from an audio output unit 104.

The first embodiment adopts a display device 112 of 960 pixels in the horizontal direction and 720 pixels in the vertical direction.

Reference numeral 109 denotes a card slot which connects a removable memory card or the like and is used to exchange data with a digital camera in the first embodiment. Reference numeral 105 denotes an image data input unit which loads digital image data from a memory card connected to the card slot 109. Reference numeral 106 denotes an image decoder which decodes digital image data input from the image data input unit 105.

Reference numeral 110 denotes a display controller which instructs the image data input unit 105 to load an image, the image decoder 106 to execute processing, the video memory 107 to write display data, the display composition unit 108 to perform composition processing, and the memory device 113 to store information. The display controller 110 acquires input data from a remote controller 114 via a user input unit 111, and acquires photographing data attached to digital image data via the image data input unit 105.

Figure 2:
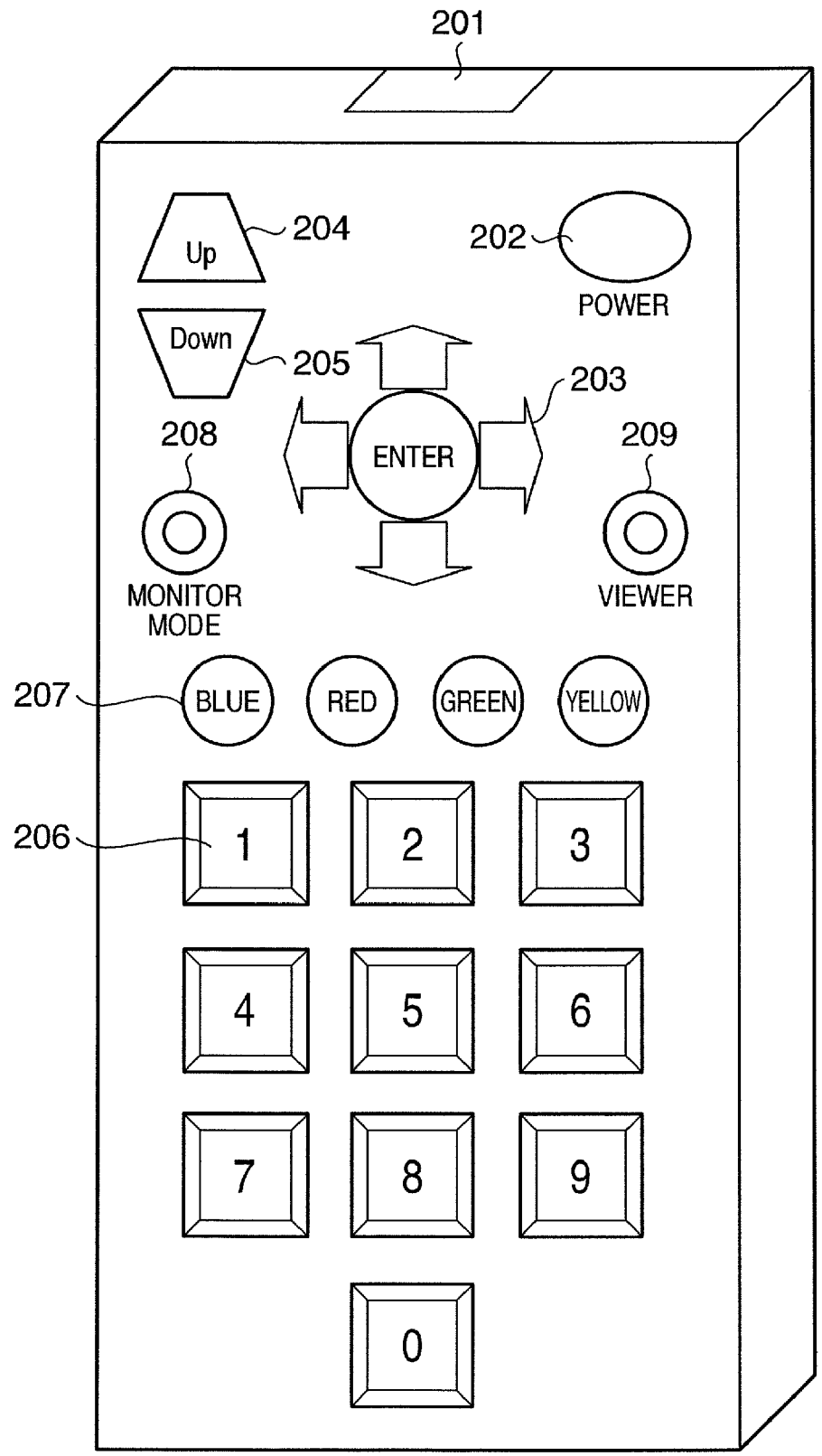
FIG. 2 is a view showing the remote controller of the digital TV receiver according to the first embodiment.

FIG. 2 illustrates the remote controller 114. FIG. 2 shows only buttons to perform an operation for implementing functions necessary to describe the first embodiment. Buttons necessary for an actual receiver are not limited to them.

In FIG. 2, reference numeral 201 denotes a light emitter for performing infrared communication between the remote controller and the user input unit 111 in FIG. 1; 202, a power key for turning on/off the power supply; 203, a cursor & enter key having an enter key at the center of up, down, left, and right buttons; 204 and 205, Up/Down keys made up of two Up and Down buttons; 206, a numeric key pad on which figures of 1 to 9 and 0 are arrayed in a matrix; and 207, a color key pad on which buttons of four, blue, red, green, and yellow colors are arranged in a single horizontal line.

Reference numeral 208 denotes a monitor mode key for switching the display mode of the monitor of the digital TV receiver; and 209, a viewer key for calling an image viewer function.

A digital image used in the first embodiment is still image data photographed by a digital camera. Still image data is compressed by JPEG by the digital camera, recorded as a still image data file in a memory card, and then used. In the following description, an "image file" means still image data. For descriptive convenience, all still image data used in the first embodiment have a size of 1,600×1,200.

(Description of Operation)

Display of a digital image on the digital TV receiver 100 according to the first embodiment starts when the user inserts a memory card into the card slot 109 and calls the image viewer function by remote control.

Figure 3B:
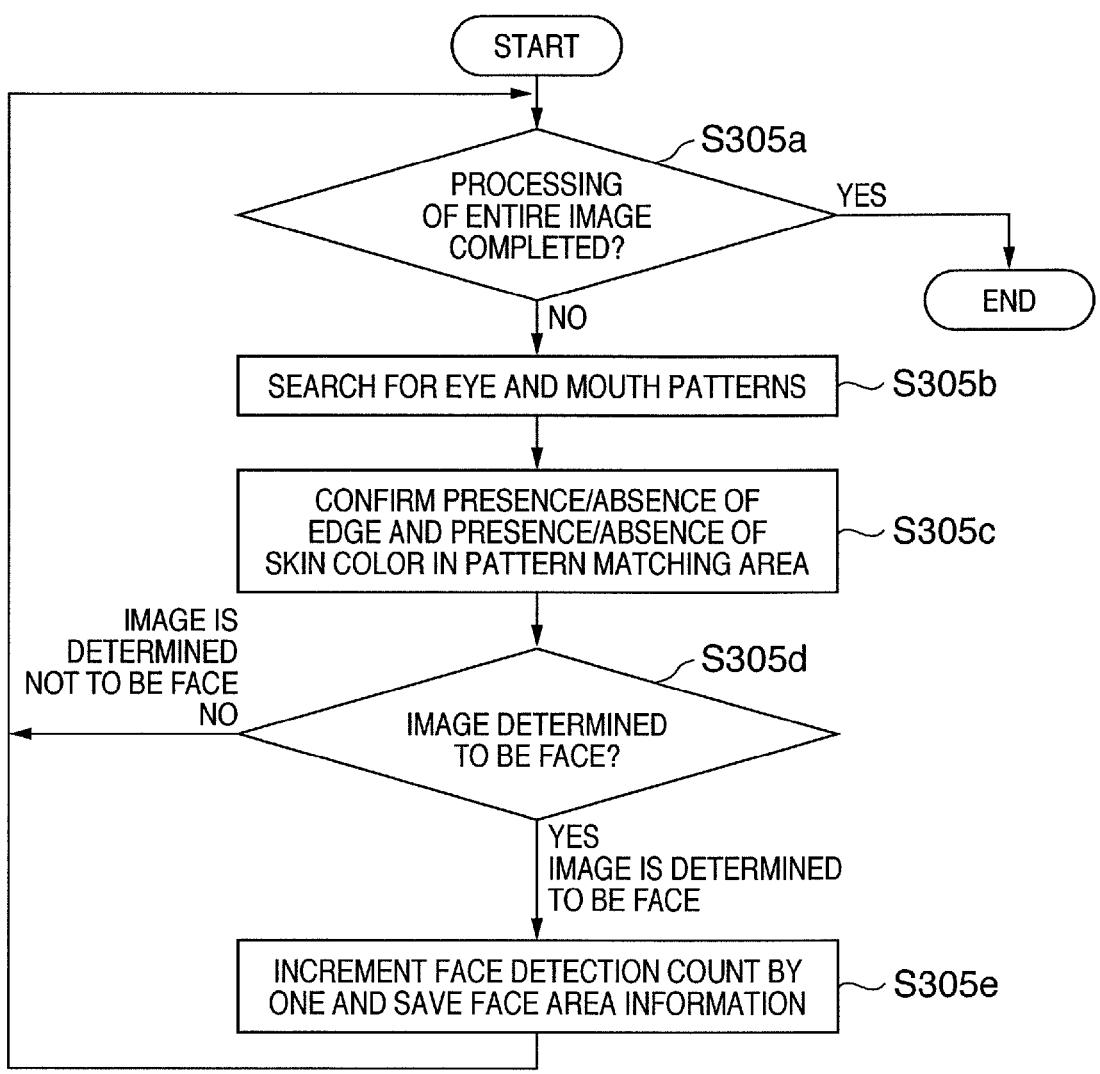

FIGS. 3A and 3B are flowcharts mainly showing the operation of the display controller 110 as for the operation of part of the image viewer function in the digital TV receiver. The operation will be explained with reference to FIGS. 3A and 3B.

(Start of Slide Show)

When the user presses the viewer key 209 of the remote controller shown in FIG. 2, the display controller 110 starts processing shown in FIG. 3A.

The display controller 110 reads out and stores, via the image data input unit 105, the total number of image files in a memory card inserted into the card slot 109 (S301). The display controller 110 reads out the image file of the first image to acquire the image size (S303). Then, the display controller 110 sends the image data to the image decoder 106 where the image data is decoded (S304). The display controller 110 performs face detection processing using the decoded image (3305).

(Face Detection Processing)

In face detection processing, the display controller 110 searches the image for the patterns of eyes and mouth which characterize the face. If the patterns are detected, the display controller 110 confirms the presence/absence of the skin color and the presence/absence of the edge, and determines whether the image is a face (S305a to S305e in FIG. 3B). If the display controller 110 determines that the image is a face, it increments the face detection count by one, and saves the face detection count in the memory device 113 together with face area information (center coordinates (X,Y) using the upper left end of image data as the origin and the radius r of the face area).

(Effect Determination Processing Corresponding to Detection Count)

After the end of face detection processing for the first image, the display controller 110 executes display effect selection processing for the first image on the basis of the result of face detection processing (S306). In the first embodiment, a display effect corresponding to the number of detected faces is selected using a table shown in FIG. 4. For example, when the number of detected faces is one, display effect processing "full view→zooming to face position" is selected in accordance with the table of FIG. 4. When the number of detected faces is two or three, a display effect "panning on a line passing through faces upon zooming" is selected. When the number of detected faces is four or more, a display effect "full view→zoom out" is selected.

The terms "zoom" and "zooming" do not always mean extracting and enlarging part of image data. Processing of changing, e.g., 1,600×1,200 image data used in the first embodiment as if the image were partially enlarged from a reference image which is reduced and displayed on the full screen (960×720) is called "zoom" or "zooming". In other words, "full view→zooming to face position" means processing of first reducing 1,600×1,200 image data to 3/5 to display the image on the full screen (960×720), and then changing the zoom ratio so as to always keep the display at 960×720 while reducing the image extraction area.

(Panning Area Determination Processing)

An operation when the panning display effect is selected in display effect selection processing (S306) will be described in detail.

Figure 5:
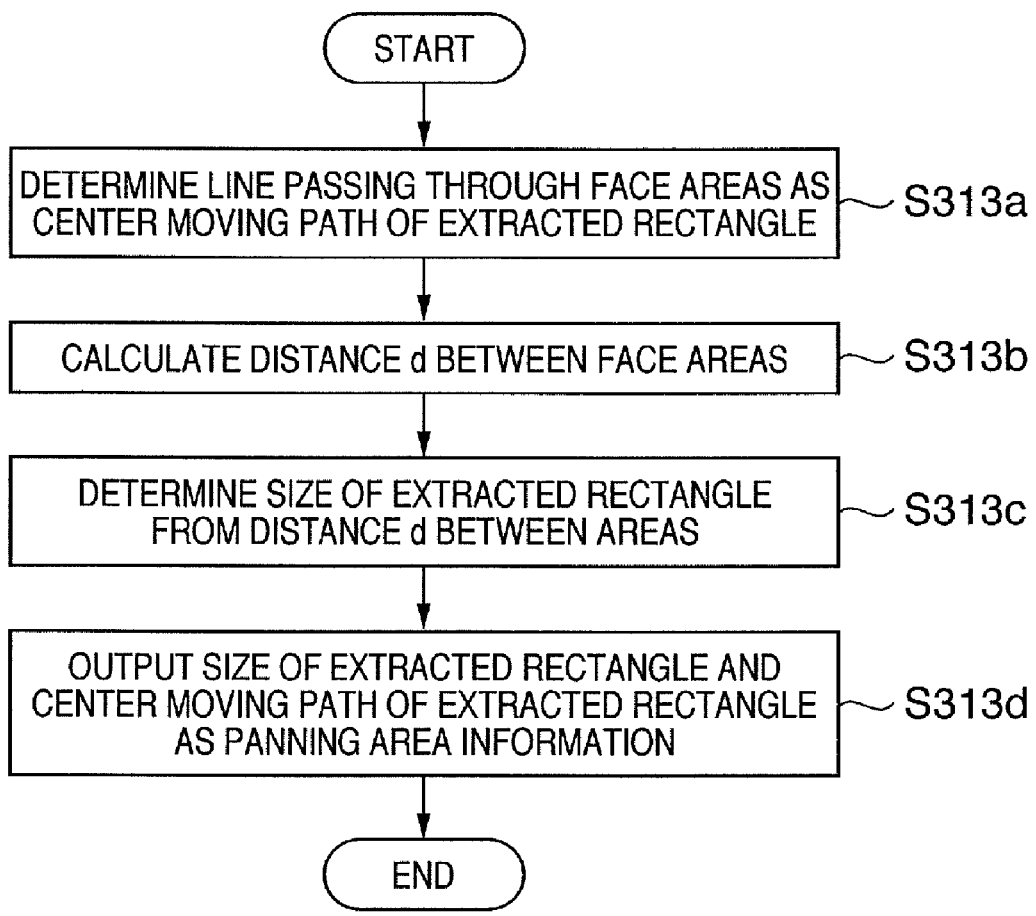
FIG. 5 is a flowchart showing in detail panning area determination processing in the first embodiment.
Figure 8A:
FIGS. 8A to 8H are views showing display examples by display control processing in the first embodiment.
Figure 8B:
Figure 8C:
Figure 8D:
Figure 8E:
Figure 8F:
Figure 8G:
Figure 8H:

If the panning display effect is selected, panning area determination processing shown in FIG. 5 is executed.

In FIG. 5, the display controller 110 determines, from position information of face areas, a line passing through the face areas as the center moving path of an extracted rectangle (S313a), and calculates a distance d between the face areas (S313b). The distance between face areas represents a "gap" which is a non-face area between the face areas. The distance d is calculated by subtracting the radii of face areas from the distance between the center coordinates of the face areas.

The display controller determines the size of an extracted rectangle from the calculated distance d between the face areas by using a table shown in FIG. 6 (S313c). The display controller outputs and stores, as panning area information, the determined size of the extracted rectangle and the center moving path information of the extracted rectangle that is determined in the processing of S313a (S313d).

The display controller 110 executes display effect processing by, while changing conditions, successively drawing display data in the video memory on the basis of a selected display effect, face position information stored in the memory device, or the panning area information determined in S313d (S307).

FIGS. 7A to 7C are views showing states of display effect processing performed by the display controller 110.

For example, when image data as shown in FIG. 7A is processed, face detection processing yields results:

face detection count: 1, face area: x: 674 y: 288 r: 70

From the result "face detection count: 1" of the above-described processing, the display effect "full view→zooming to face position" is selected. The display controller 110 executes processing of full view→zooming to the face position for the image. More specifically, an area "a" in FIG. 7A is first displayed on the full screen. While the zoom ratio is increased slowly, images are successively drawn in the video memory. When the display area reaches an area "b", the drawing processing ends.

After the end of display effect processing for the first image, the display controller 110 performs the same processing for the second and subsequent images. For example, when the second photograph is image data as shown in FIG. 7B, face detection processing yields results:

face detection count: 2, face area (1): x: 650 y: 456 r: 60, face area (2): x: 840 y: 596 r: 58

From the result "face detection count: 2" of the above-described processing, the display effect "panning on a straight line passing through faces upon zooming" is selected by the above-described face detection processing.

By the processing in FIG. 5, the display controller 110 determines a line "c" in FIG. 7B passing through the two face positions as the center moving path of an extracted rectangle. Further, the display controller 110 calculates the distance (118 pix) between the face areas.

distance $d$ between face areas=$SQRT\{(840-650)^2+(596-456)^2\}-60-58=118$ (pix)

where SQRT is the square root operation.

The display controller 110 determines "600×450" as the size of the extracted rectangle on the basis of the table of FIG. 6. The display controller 110 successively draws images in the video memory on the basis of the center moving path of the extracted rectangle and the size information of the extracted rectangle so that the image moves slowly from an area "d" to an area "e".

When the third photograph is image data as shown in FIG. 7C, face detection processing yields results:

face detection count: 2, face area (1): x: 335 y: 441 r: 55, face area (2): x: 1107 y: 294 r: 56

From the result "face detection count: 2" of the above-described processing, the display effect "panning on a straight line passing through faces upon zooming" is selected by the above-described face detection processing.

By the processing in S313, the display controller 110 determines a line "f" in FIG. 7C passing through the two face positions as the center moving path of an extracted rectangle. Further, the display controller 110 calculates the distance between the face areas.

distance $d$ between face areas=$SQRT\{(1107-335)^2+(441-294)^2\}-55-56=674$ (pix)

The display controller 110 determines "800×600" as the size of the extracted rectangle on the basis of the table of FIG. 6. The display controller 110 successively draws images in the video memory on the basis of the center moving path of the extracted rectangle and the size information of the extracted rectangle so that the image moves from an area "g" to an area "h" slowly at a constant speed.

(Operation)

FIGS. 8A to 8H show examples of the display results of the above-described processing by the display controller 110. FIGS. 8A to 8D represent in order of time a state in which the image in FIG. 7B is displayed. FIGS. 8E to 8H represent in order of time a state in which the image in FIG. 7C is displayed.

By the operation of the display controller in the first embodiment, the display effect of panning display on a line linking face areas can be added to an image in which two face areas are detected.

When the distance between two face areas is equal to or more than a predetermined value, the size of the extracted rectangle area is changed by the processes in S313a to S313d of FIG. 5 in the first embodiment. It can be prevented to display an image containing no face area for a long time during panning.

Figure 9A:
FIGS. 9A to 9C are views showing an operation when panning processing is controlled at a fixed size without performing the panning area determination processing shown in FIG. 5.
Figure 9B:
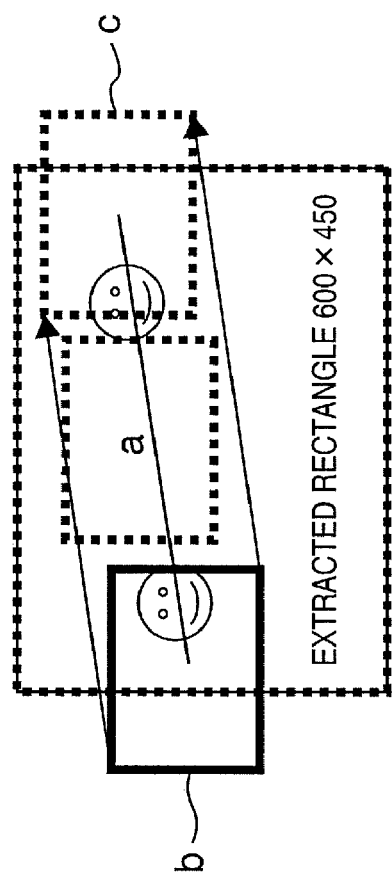
Figure 9C:
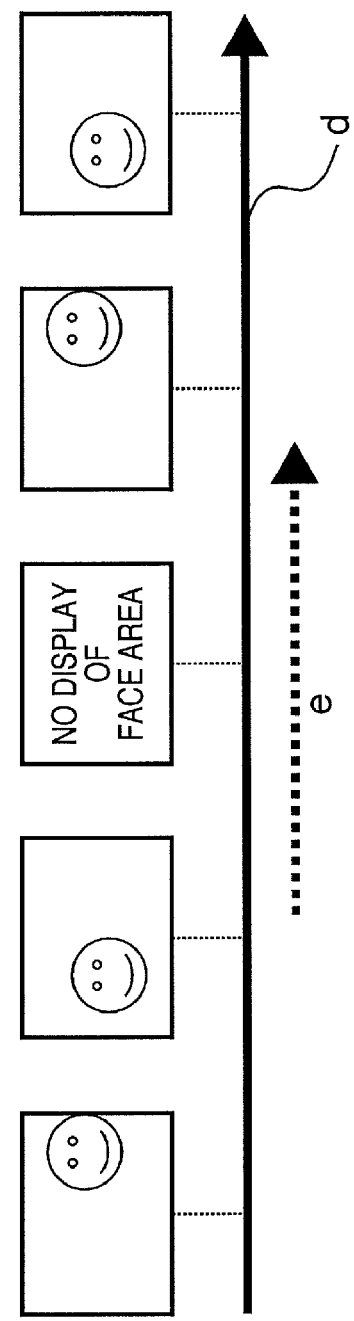

FIGS. 9A to 9C are views showing an example of an operation when the size of a rectangle extracted from the same image as that in FIG. 7C is always kept constant without performing the processing in S313c of FIG. 5. If the extracted rectangle is changed from b to c, as shown in FIG. 9B, the period (period e in FIG. 9C) during which neither of the two face areas is displayed becomes long in the total time (period d in FIG. 9C) of the panning display effect, as shown in FIG. 9C, failing in effective display.

However, by executing the extracted rectangle size determination processing corresponding to the distance between face areas as described in the first embodiment, either face area is always displayed to provide effective display.

As face detection processing, the first embodiment adopts a method of detecting the skin color in determining whether the image is a face. However, the gist of the present invention is not limited to this, and another method may also be employed.

In the first embodiment, processing proceeds in order of image data loading processing, face detection processing, effect determination processing, and display effect execution processing for descriptive convenience. However, the gist of the present invention is not limited to this. For example, loading processing, face detection processing, and effect determination processing for the (N+1)th image data may be done in parallel with display effect execution processing for the Nth image.

In the above description, a value "500 pix" is used to determine whether the distance between face areas is long or short, and values "600×450 pix" and "800×600 pix" are used as the sizes of extracted rectangles. However, these values are set by the present inventor from an image resolution "1,600× 1,200" used in the first embodiment. The gist of the present invention is not limited to them, and other values may also be adopted. Other values are desirable especially when an image of an image resolution different from one used in the first embodiment is adopted. If a plurality of image resolutions coexist, each image size is acquired, and then values corresponding to the resolution are desirably used.

Second Embodiment

The second embodiment according to the present invention will be described.

A digital TV receiver used in the second embodiment has the same configuration as that shown in FIG. 1, and a description thereof will be omitted. A remote controller is also identical to that in FIG. 2, and a description thereof will be omitted.

In the first embodiment described above, the size of an extracted rectangle is controlled on the basis of the distance between face areas in executing panning display. In the second embodiment, unlike the first embodiment, the panning speed, i.e., the moving speed of an extracted rectangle is controlled without controlling the size of the extracted rectangle on the basis of the distance between face areas.

(Display Effect Processing and Operation)

For example, when image data as shown in FIG. 7C is processed, face detection processing yields results:

face detection count: 2, face area (1): x: 335 y: 441 r: 55, face area (2): x: 1107 y: 294 r: 56

Figure 10:
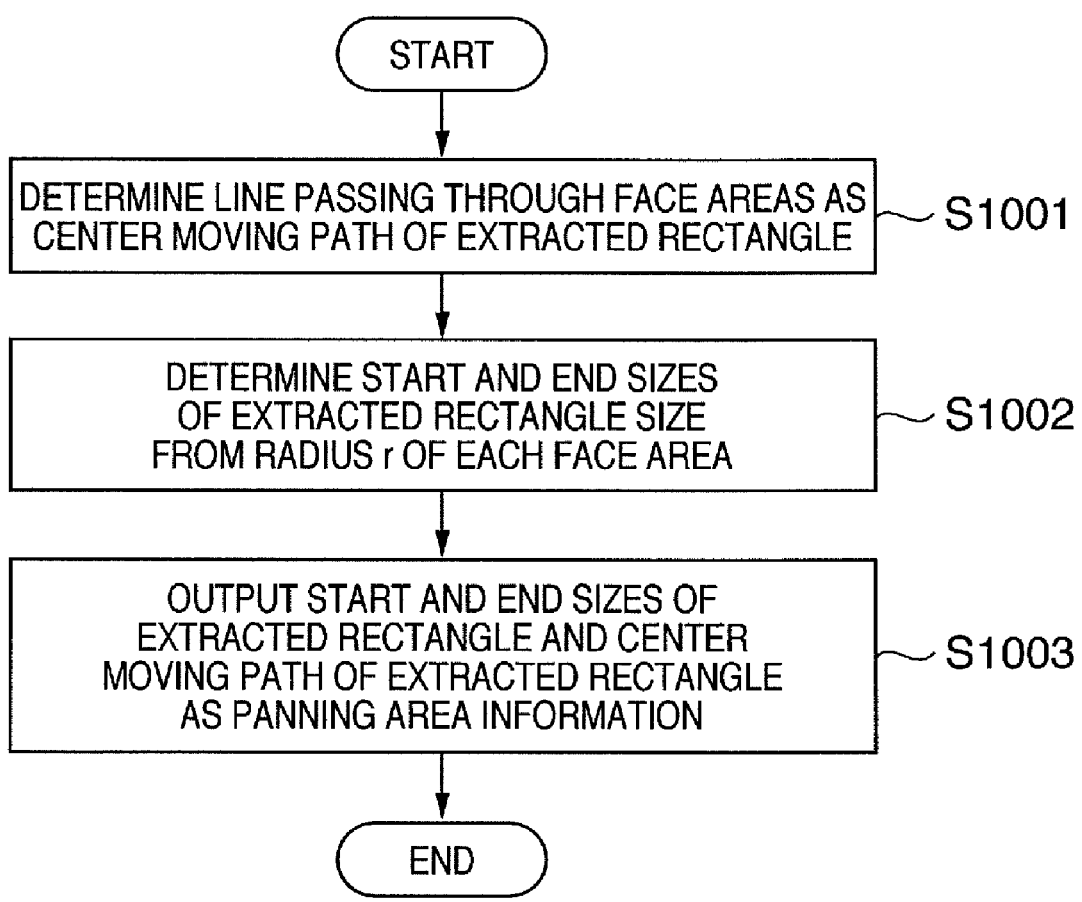
FIG. 10 is a flowchart showing in detail panning area determination processing in the second embodiment.

Similar to the first embodiment, from the result "face detection count: 2" of processing shown in FIGS. 3A, 3B, and 4, the display effect "panning on a straight line passing through faces upon zooming" is selected by the above-described face detection processing. In accordance with a sequence shown in FIG. 10, a display controller 110 determines, from position information of face areas, a line passing through the face areas as the center moving path of an extracted rectangle (S1001). The display controller 110 determines the size of an extracted rectangle on the basis of the radius r of each face area that is obtained by the processing in S305 of FIG. 4 (S1002). In the second embodiment, the widths of the start and end sizes of the extracted rectangle are set to 10 times larger than the radius of each face area. The height is set to ¾ of the width. More specifically, when image data as shown in FIG. 9A is processed, the width of the start size of the extracted rectangle is 55×10=550 (pix), and that of the end size is 56×10=560 (pix).

Information on the center moving path of the extracted rectangle and information on the start and end sizes of the extracted rectangle are set as panning area information (S1003).

(Speed Control Near Feature Area and in Remaining Area)

Figure 11:
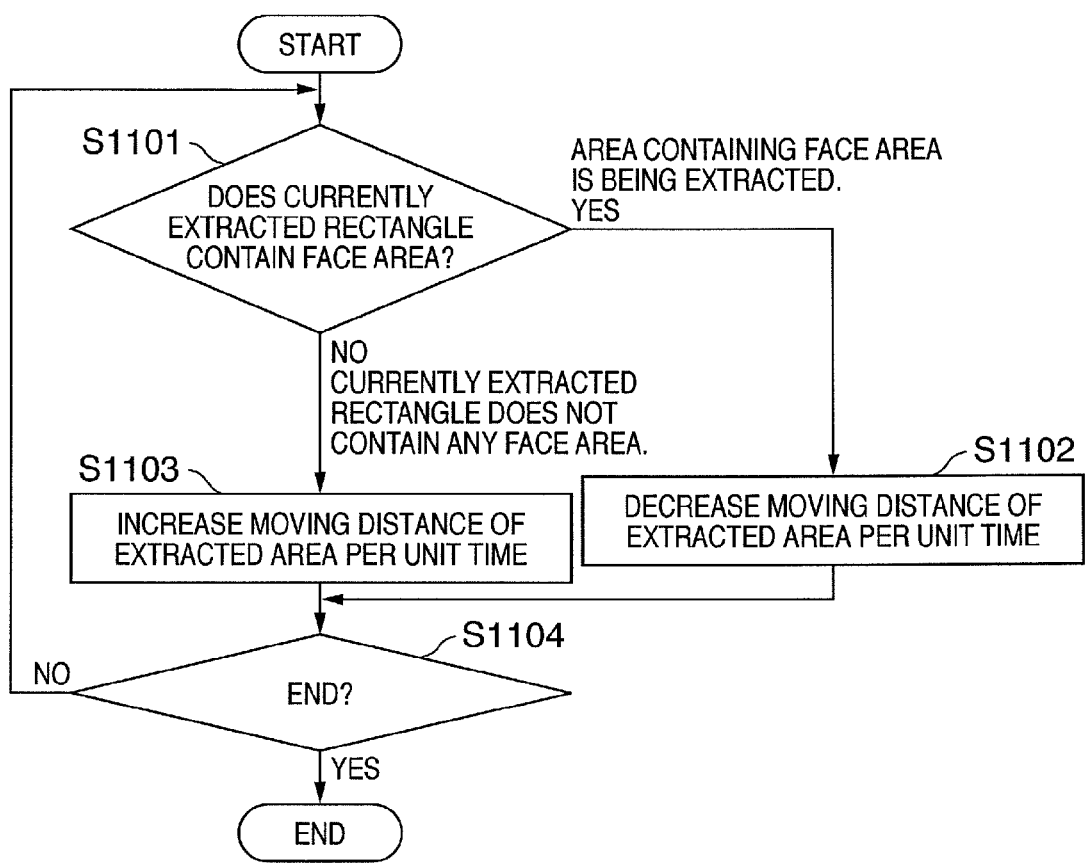
FIG. 11 is a flowchart showing in detail panning display processing in the second embodiment.

After the above-mentioned panning area information is obtained, the display controller 110 successively draws images in the video memory on the basis of the center moving path of the extracted rectangle and the size information of the extracted rectangle while changing the extraction position. FIG. 11 is a flowchart showing extraction position moving speed control performed by the display controller at this time.

The display controller 110 determines whether a currently extracted rectangle contains the above-mentioned face area (S1101). If the rectangle contains the face area, the display controller 110 controls to decrease the moving distance of the extracted rectangle per unit time (S1102). If the rectangle does not contain any face area, the display controller 110 controls to increase the moving distance of the extracted rectangle per unit time (S1103).

(Operation)

Figure 12:
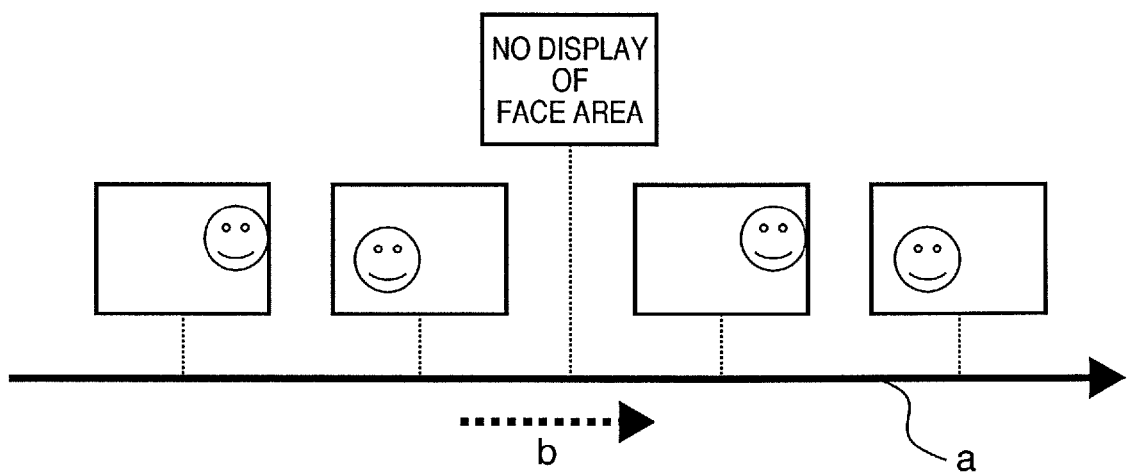
FIG. 12 is a view showing the operation of display control processing in the second embodiment.

FIG. 12 shows an example of the display result of the above-described processing by the display controller 110.

By the processing of the display controller 110 in the second embodiment, the moving speed of an extracted rectangle increases when a currently extracted rectangle does not contain any face area. The ratio of the period (period b in FIG. 12) during which no face area is displayed to the total time (period a in FIG. 12) of panning display processing becomes lower than the ratio when the position of an extracted rectangle is changed at a uniform speed (FIG. 9C). That is, the ratio of the time during which a face area is displayed during panning display increases, and a higher display effect can be obtained.

In the above description, the moving amount per unit time is determined on the basis of whether an extracted rectangle contains a face area. However, the gist of the present invention is not limited to this. For example, the moving amount per unit time may be controlled in accordance with the distance between the center of a face area and that of an extracted rectangle.

Third Embodiment

The third embodiment according to the present invention will be described.

In the first embodiment described above, when an image in which a plurality of face areas are detected is panned and displayed, the size of an extracted rectangle is determined on the basis of the distance between face areas, and the same size of the extracted rectangle is applied to all image extraction steps. In the third embodiment, unlike the first embodiment, the rectangle size is changed for every image extraction step.

The third embodiment also adopts the digital TV receiver of the configuration shown in FIG. 1 and the remote controller shown in FIG. 2.

(Description of Operation)

The processing operation of a display controller 110 in the third embodiment is executed in accordance with the sequence shown in FIGS. 3A and 3B, similar to the first embodiment.

For example, when image data as shown in FIG. 9A is processed, face detection processing (S305) yields results:
face detection count: 2, face area (1): x: 335 y: 441 r: 55, face area (2): x: 1107 y: 294 r: 56

Similar to the first embodiment, from the result "face detection count: 2" of processing shown in FIGS. 3A and 3B, the display effect "panning on a straight line passing through faces upon zooming" is selected by the above-described face detection processing.

Figure 13:
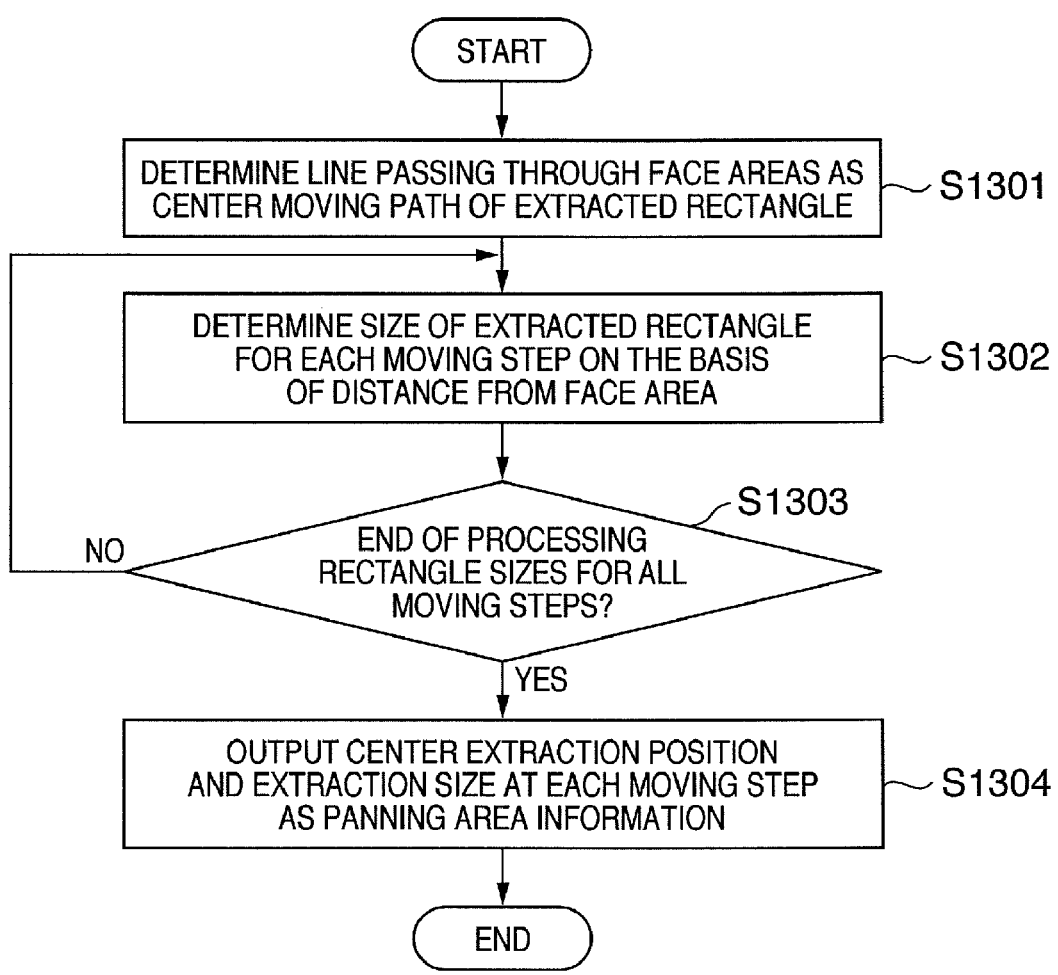
FIG. 13 is a flowchart showing in detail panning area determination processing in the third embodiment.
Figure 14:
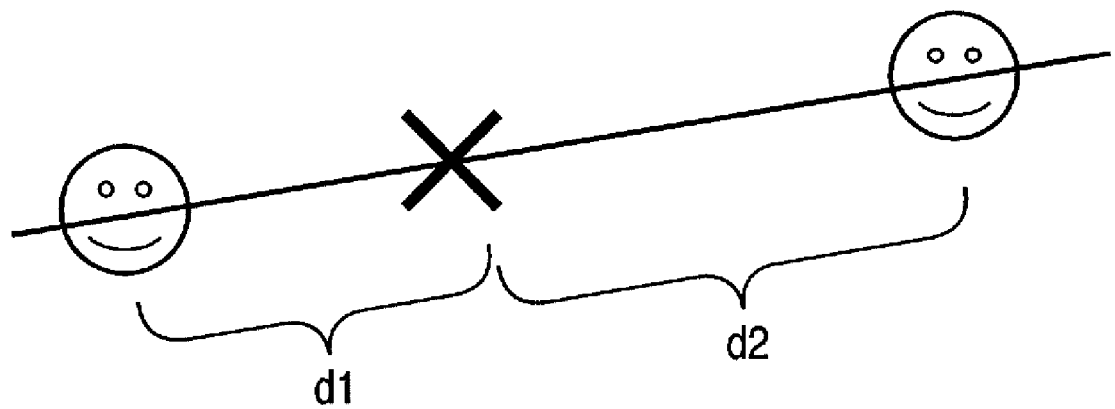
FIG. 14 is a view showing the relationship between a face area and the center position of a rectangle in a given moving step in the third embodiment.

In accordance with a sequence shown in FIG. 13, the display controller 110 determines, from position information of face areas, a line passing through the face areas as the center moving path of an extracted rectangle (S1301). The display controller 110 determines the size of an extracted rectangle for each moving step on the basis of the face area position information obtained by the above-described face detection processing (S1302). In the third embodiment, the size of the extracted rectangle is determined on the basis of the minimum distance (in FIG. 14, a smaller one of d1 and d2=d1) between the coordinates of the face area and coordinates (x in FIG. 14) corresponding to each moving step on the center moving path of the extracted rectangle:

width ($W$) of extracted rectangle=500+min($d1$, $d2$)× 1.2 where min( ) is processing of choosing a minimum value.

width ($H$) of extracted rectangle=$W$*¾

For example, when the image in FIG. 9A is processed and the position of the extracted rectangle coincides with that of either face area, W=500+0=500 and H=500*¾=375, and the rectangle has a size of 500×375.

When the position of the extracted rectangle coincides with just the center between the two face areas, W=500+785 (distance between the face areas)/2*1.2=970 and H=970*¾=727, and the rectangle has a size of 970×727.

After the display controller 110 calculates the position and size of the extracted rectangle for each moving step, it holds them as panning area information (S1303 and S1304). While changing the extraction position and size on the basis of the panning area information, the display controller 110 successively reads out images and draws them in the video memory (S307).

(Operation)

Figure 15A:
FIGS. 15A to 15C are views showing the operation of display control processing in the third embodiment.
Figure 15B:
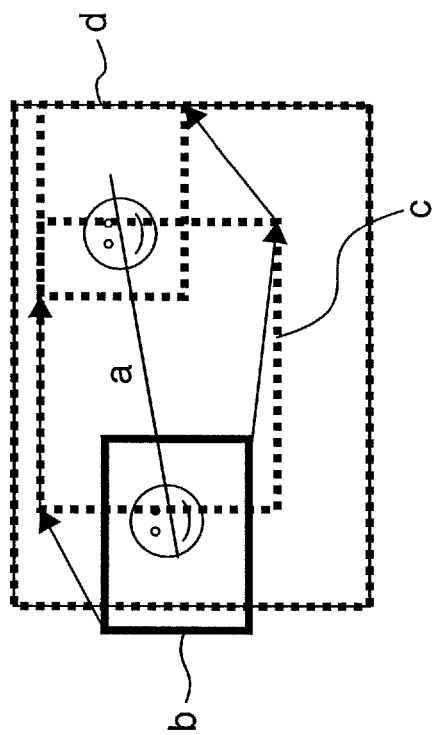
Figure 15C:
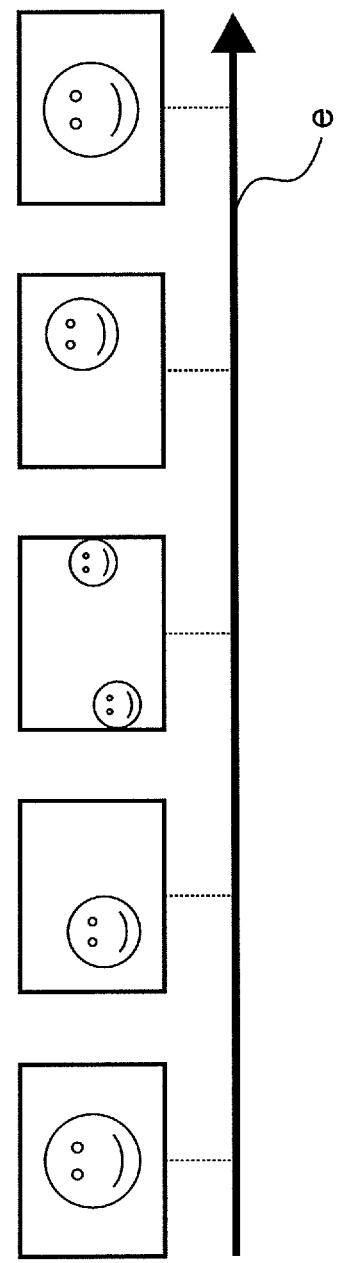

FIGS. 15A to 15C show an example of a display result by the display controller 110 described above. The display controller 110 according to the third embodiment controls to decrease the rectangle size (rectangles b and d in FIG. 15B) when the position of a currently extracted rectangle is close to either face area, and increase the rectangle size (rectangle c in FIG. 15B) when the position of a currently extracted rectangle is apart from both the face areas.

FIG. 15C is a view showing images displayed on the display screen in time series. According to display control of the third embodiment, even if face areas are apart from each other, either face can always be displayed during panning display of emphasizing a face area, and a higher display effect can be implemented.

In the above description, values "500" and "1.2" are used for the equation to calculate the size of an extracted rectangle. However, these values are set as preferable values by the present inventor from an image resolution "1,600×1,200" used in the third embodiment. The gist of the present invention is not limited to them, and other values may also be adopted. Other values are desirable especially when an image of an image resolution different from one used in the third embodiment is adopted. If a plurality of image resolutions coexist, each image size is acquired, and then values corresponding to the resolution are desirably used.

Figure 16:
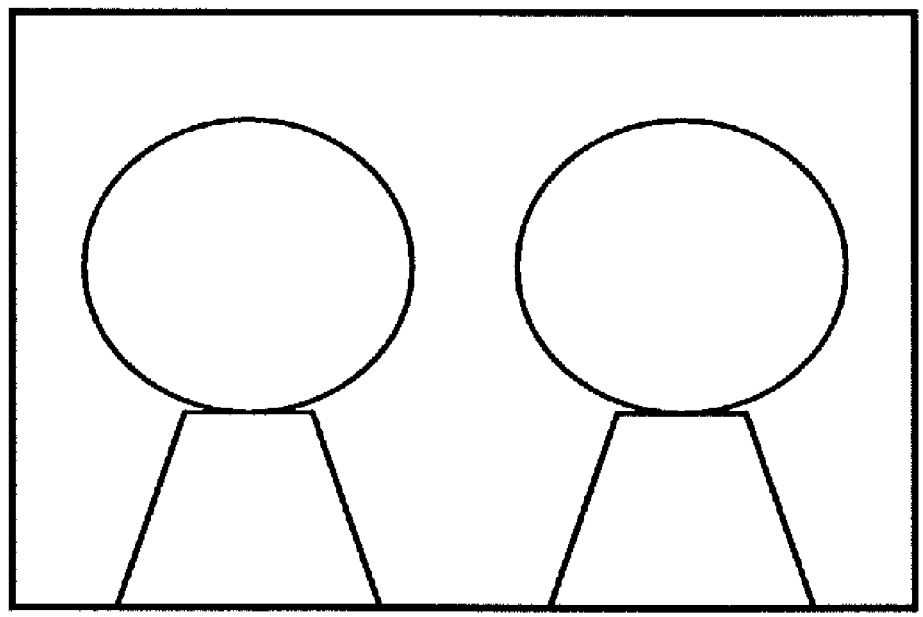
FIG. 16 is a view illustrating the monitor of a digital camera having a photographing mode in which a plurality of object positions are designated.

In the above embodiments, face detection processing is used as a means for detecting the feature area of an image. Instead, for example, when a digital camera performs face detection processing in photographing, the above-described face detection processing can be replaced with processing of reading out a face detection processing result recorded on a recording medium. When the digital camera can set, as a photographing scene mode, a mode in which the object position or focal position is fixed, as shown in FIG. 16, a feature area may also be detected using information on this photographing scene mode.

In the description of the embodiments, the digital TV receiver has been exemplified as an embodiment of the present invention, but the gist of the present invention is not limited to this. For example, the present invention can also be applied to the form of a set-top box which plays back images photographed by a digital camera, or the form of software for a personal computer. The present invention can also be applied to the form of a digital camera having a slide show playback function.

Other Embodiment

The present invention can take an embodiment of a system, apparatus, method, program, storage medium (recording medium), or the like. More specifically, the present invention may be applied to a system including a plurality of devices or an apparatus formed by a single device.

The present invention is also achieved by supplying a software program (in the above embodiments, programs corresponding to the flowcharts shown in the drawings) for implementing the functions of the above-described embodiments to a system or apparatus directly or from a remote place, and reading out and executing the supplied program codes by the computer of the system or apparatus.

The present invention is therefore implemented by program codes installed in the computer in order to implement functional processing of the present invention by the computer. That is, the present invention includes a computer program for implementing functional processing of the present invention.

In this case, the present invention can take the form of an object code, a program executed by an interpreter, or script data supplied to an OS as far as a program function is attained.

Examples of a recording medium (storage medium) for supplying the program are a floppy® disk, hard disk, optical disk, magnetooptical disk, MO, CD-ROM, CD-R, CD-RW, magnetic tape, nonvolatile memory card, RON, and DVD (DVD-ROM and DVD-R).

As another program supply method, the program can be supplied by connecting a client computer to an Internet Web page via the browser of the client computer, and downloading the computer program of the present invention or a compressed file containing an automatic installing function from the Web page to a recording medium such as a hard disk. The program can also be implemented by grouping program codes which form the program of the present invention into a plurality of files, and downloading the files from different Web pages. That is, the present invention also includes a WWW server which allows a plurality of users to download the program files for implementing functional processing of the present invention by a computer.

The program of the present invention can be encrypted, stored in a storage medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiments are implemented when the computer executes the readout program codes. Also, the functions of the above-described embodiments are implemented when an OS or the like running on the computer performs part or all of actual processing on the basis of the instructions of the program.

The functions of the above-described embodiments are implemented when the program read out from the recording medium is written in the memory of a function expansion board inserted into the computer or the memory of a function expansion unit connected to the computer, and the CPU of the function expansion board or function expansion unit performs part or all of actual processing on the basis of the instructions of the program.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-175379, filed Jun. 15, 2005, which is hereby incorporated by reference herein in its entirety.

What is claimed is:

1. An image display method of adding a special effect to a plurality of still images, changing the plurality of still images in time series, and sequentially displaying the plurality of still images by a slide show, said image display method comprising the following steps executed by an image display apparatus:

a detection step of detecting a feature area from a still image which is subjected to display by the slide show;

a determination step of determining a special effect used for a still image of which the feature area is detected in said detection step, wherein the special effect is a panning from a display state wherein a predetermined sized area containing one feature area is extracted and enlarged to a display state wherein a predetermined sized area containing another feature area is extracted and enlarged; and a display control step of displaying the still image with the use of the determined special effect, wherein in said determination step, the extracted area size is determined on the basis of a distance between the one feature area and the another feature area.

2. The method according to claim 1, wherein in said determination step, the extracted area size is determined to be larger if the distance between the one feature area and the another feature area is longer.

3. The method according to claim 1, wherein in said detection step, a person's face area in a still image is detected as the feature area.

4. The method according to claim 1, wherein in said detection step, an object position or a focal position in a still image is detected as the feature area by using photographing information of the still image.

5. A program for causing a computer to execute an image display method defined in claim 1.

6. A computer-readable recording medium which stores a program defined in claim 5.

7. An image display method of adding a special effect to a plurality of still images, changing the plurality of still images in time series, and sequentially displaying the plurality of still images by a slide show, said image display method comprising the following steps executed by an image display apparatus;

a detection step of detecting a feature area from a still image which is subjected to display by the slide show;

a determination step of determining a special effect used for a still image of which the feature area is detected in said detection step, wherein the special effect is a panning from a display state wherein a predetermined sized area containing one feature area is extracted and enlarged to a display state wherein a predetermined sized area containing another feature area is extracted and enlarged; and a display control step of displaying the still image with the use of the determined special effect, wherein in said display control step, a moving speed of the panning is controlled to be low near the feature area and high in a remaining area.

8. An image display method of adding a special effect to a plurality of still images, changing the plurality of still images in time series, and sequentially displaying the plurality of still images by a slide show, said image display method comprising the following steps executed by an image display apparatus:

a detection step of detecting a feature area from a still image which is subjected to display by the slide show;

a determination step of determining a special effect used for a still image of which the feature area is detected in said detection step, wherein the special effect is a panning from a display state wherein a predetermined sized area containing one feature area is extracted and enlarged to a display state wherein a predetermined sized area containing another feature area is extracted and enlarged; and a display control step of displaying the still image with the use of the determined special effect, wherein during the panning in said display control step, the extracted area size is controlled to be larger if a distance from the feature area is longer.

9. An image display apparatus which adds a special effect to a plurality of still images, changes the plurality of still images in time series, and sequentially displays the plurality of still images by a slide show, said image display apparatus comprising:
a detection unit adapted to detect a feature area from a still image which is subjected to display by the slide show;
a determination unit adapted to determine a special effect used for a still image of which the feature area is detected by said detection unit, wherein the special effect is a panning from a display state wherein a predetermined sized area containing one feature area is extracted and enlarged to a display state wherein a predetermined sized area containing another feature area is extracted and enlarged; and
a display controller adapted to display the still image with the use of the determined special effect,
wherein in said determination unit, the extracted area size is determined on the basis of a distance between the one feature area and the another feature area.

10. The apparatus according to claim 9, wherein in said determination unit, the extracted area size is determined to be larger if the distance between the one feature area and the another feature area is longer.

11. The apparatus according to claim 9, wherein said detection unit detects a person's face area in a still image as the feature area.

12. The apparatus according to claim 9, wherein said detection unit detects an object position or a focal position in a still image as the feature area by using photographing information of the still image.

13. An image display apparatus which adds a special effect to a plurality of still images, changes the plurality of still images in time series, and sequentially displays the plurality of still images by a slide show, said image display apparatus comprising:
a detection unit adapted to detect a feature area from a still image which is subjected to display by the slide show;
a determination unit adapted to determine a special effect used for a still image of which the feature area is detected by said detection unit, wherein the special effect is a panning from a display state wherein a predetermined sized area containing one feature area is extracted and enlarged to a display state wherein a predetermined sized area containing another feature area is extracted and enlarged; and
a display controller adapted to display the still image with the use of the determined special effect,
wherein said display controller controls a moving speed of the panning to be low near the feature area and high in a remaining area.

14. An image display apparatus which adds a special effect to a plurality of still images, changes the plurality of still images in time series, and sequentially displays the plurality of still images by a slide show, said image display apparatus comprising:
a detection unit adapted to detect a feature area from a still image which is subjected to display by the slide show;
a determination unit adapted to determine a special effect used for a still image of which the feature area is detected by said detection unit, wherein the special effect is a panning from a display state wherein a predetermined sized area containing one feature area is extracted and enlarged to a display state wherein a predetermined sized area containing another feature area is extracted and enlarged; and
a display controller adapted to display the still image with the use of the determined special effect,
wherein during the panning said display controller controls the extracted area size to be larger if a distance from the feature area is longer.

* * * * *